US008527530B2

(12) United States Patent
de Léon et al.

(10) Patent No.: US 8,527,530 B2
(45) Date of Patent: Sep. 3, 2013

(54) DESTINATION PREDICTION USING TEXT ANALYSIS

(75) Inventors: David de Léon, Lund (SE); Johan Thoresson, Malmö (SE); Linda Tolj, Malmö (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 295 days.

(21) Appl. No.: 12/728,771

(22) Filed: Mar. 22, 2010

(65) Prior Publication Data
US 2011/0231425 A1   Sep. 22, 2011

(51) Int. Cl.
*G06F 7/00* (2006.01)
*G06F 17/30* (2006.01)
(52) U.S. Cl.
USPC ............................................................ 707/758
(58) Field of Classification Search
USPC .................................................. 707/758, 706
See application file for complete search history.

(56) References Cited

U.S. PATENT DOCUMENTS

| 2004/0203949 | A1 | 10/2004 | Nielsen et al. |
| 2005/0017954 | A1* | 1/2005 | Kay et al. ................. 345/169 |
| 2005/0054381 | A1 | 3/2005 | Lee et al. |
| 2006/0156209 | A1* | 7/2006 | Matsuura et al. ............ 714/798 |
| 2007/0130368 | A1 | 6/2007 | Martin et al. |

FOREIGN PATENT DOCUMENTS

EP    1 786 186 A2    5/2007

OTHER PUBLICATIONS

European Search Report corresponding to EP 11 15 5590, mailed Jul. 19, 2011, 7 pages.

* cited by examiner

*Primary Examiner* — James Trujillo
*Assistant Examiner* — Jeffrey Chang
(74) *Attorney, Agent, or Firm* — Harrity & Harrity, LLP

(57) ABSTRACT

A method and device relating to destination prediction of communication messages is presented. The device may include an analyzer configured to analyze a message entered in a universal input field. The analyzer may also provide a search variable based on the entered message. The device may also include a or which may be configured to receive the search variable and determine at least one suggested destination based on the search variable. The prediction of communication destinations eliminates the need for various menus and sub-menus. Thus, a user may send a communication message without the need of lengthy navigations.

18 Claims, 4 Drawing Sheets

DESTINATION PREDICTION USING TEXT ANALYSIS

TECHNICAL FIELD

Example embodiments are directed towards destination prediction for communication devices, where a computing system may predict a desired recipient for a communication message. The destination prediction eliminates the need for navigation menus and decreases the time spent in sending communication messages.

BACKGROUND

Mobile phones often contain a number of applications and functions. Furthermore, with today's trend towards open source technology, a mobile user may quickly fill the capacity of a mobile phone with various applications. Due to the nature of mobile phones (e.g., small screens and limited input capabilities) each task a user wants to carry out typically starts with several steps of navigation before initiating the desired task. For example, to reach an application or perform a certain function a user may need to first unlock the mobile device, open a main menu, select an icon from the main menu, and then select an option from a sub-menu.

SUMMARY

Historically, attempts to limit the amount of user navigation have involved predefined and personalized shortcuts. However, as the number of applications and ways users communicate increase, shortcuts systems are either not able to handle the number of applications which may be included in a mobile phone, or the shortcut system may be too complex to be of any actual benefit as they eventually end up becoming a menu themselves.

Therefore, example embodiments are directed towards destination prediction where the need for navigation and menus are eliminated. Instead, the mobile system may be able to predict a desired application or recipient of a communication message in the same screen in which a user inputs a message. According to example embodiments, a communication designation prediction device may include an analyzer that may be configured to analyze a message entered in a universal input field. The analyzer may be further configured to provide at least one search variable from the message.

The prediction device may further include a processor that may be configured to determine at least one suggested destination of the message based on the at least one search variable. The processor may be further configured to search through a database of a user's communication history, where the search may be based on the at least one search variable. The processor may be further configured to determine the at least one suggested destination based on at least one occurrence in the communication history. The at least one occurrence may be, for example, a frequent or recent occurrence in the user's communication history. The processor may also be configured to adaptively update the communication history based on a current interaction. The at least one destination may be, for example, an application, a service, or a contact entry. The at least one search variable may be, for example, an action word or a recognized contact.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

In the following description, for purposes of explanation and not limitation, specific details are set forth, such as particular components, elements, techniques, etc. in order to provide a thorough understanding of the example embodiments. However, it will be apparent to one skilled in the art that the example embodiments may be practiced in ways which may depart from these specific details. In other instances, detailed descriptions of well-known methods and elements are omitted so as not to obscure the description of the example embodiments.

Figure 1A:
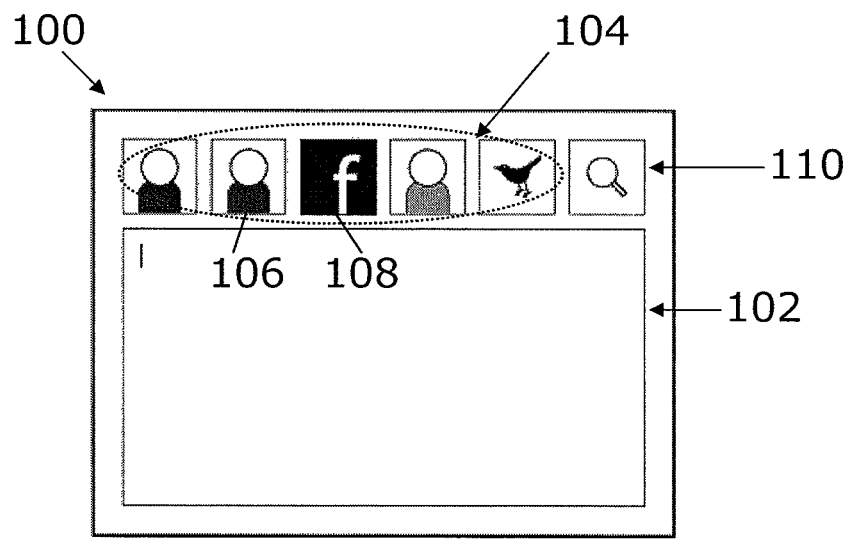
FIGS. 1A-1F are screen captions employing example embodiments.
Figure 1B:
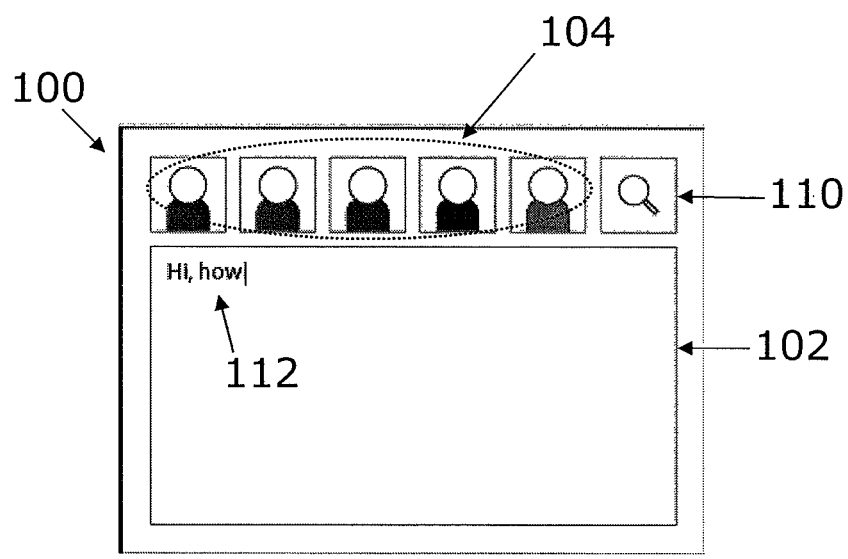
Figure 1C:
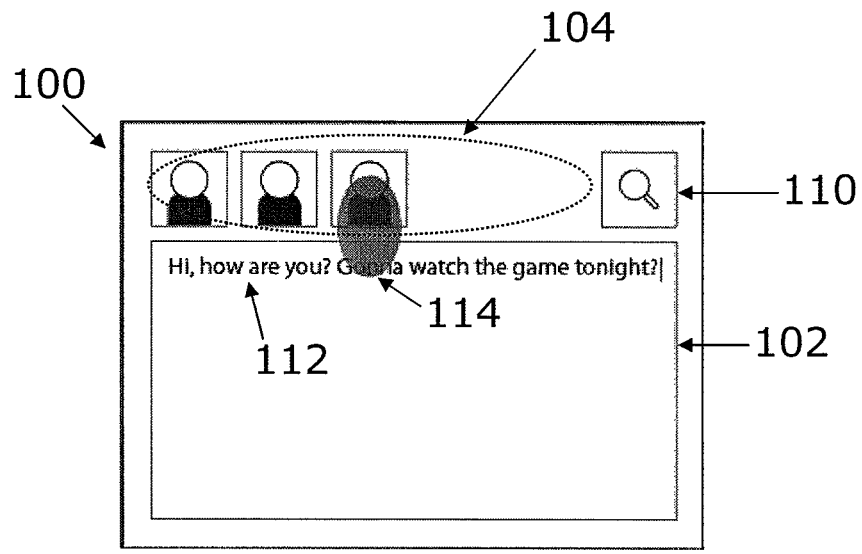
Figure 1D:
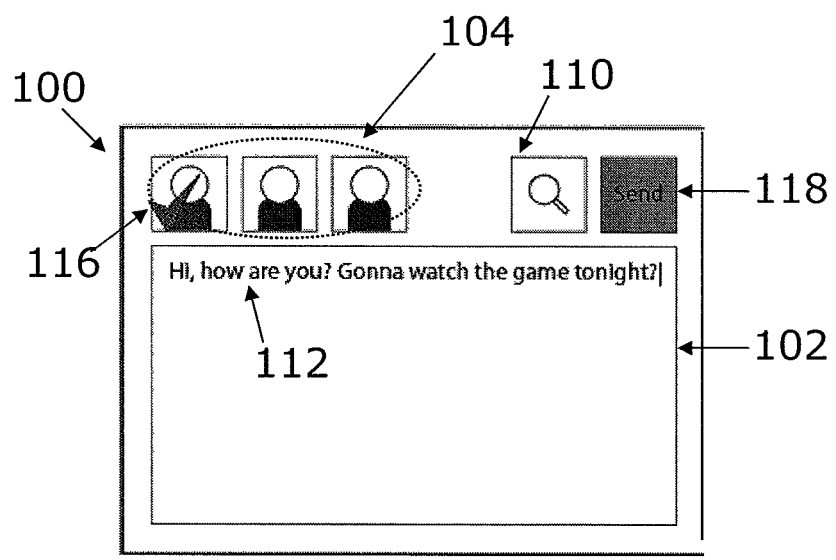
Figure 1E:
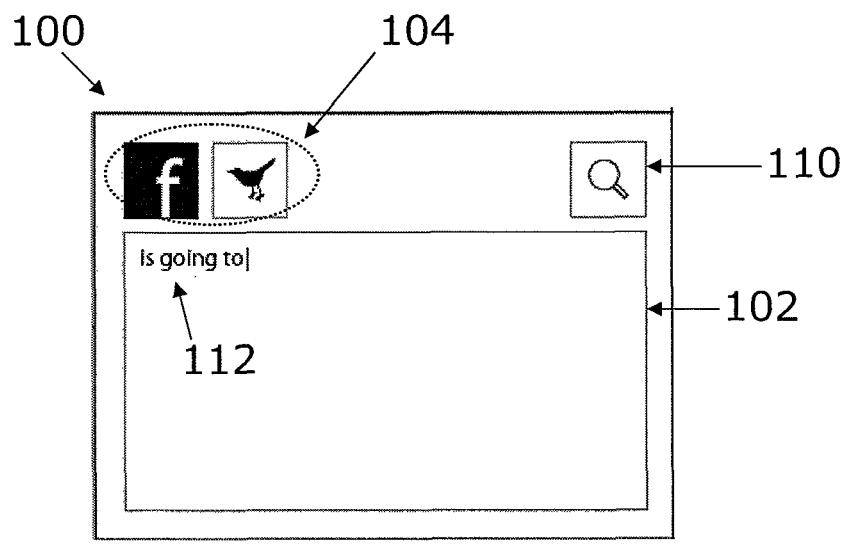
Figure 1F:
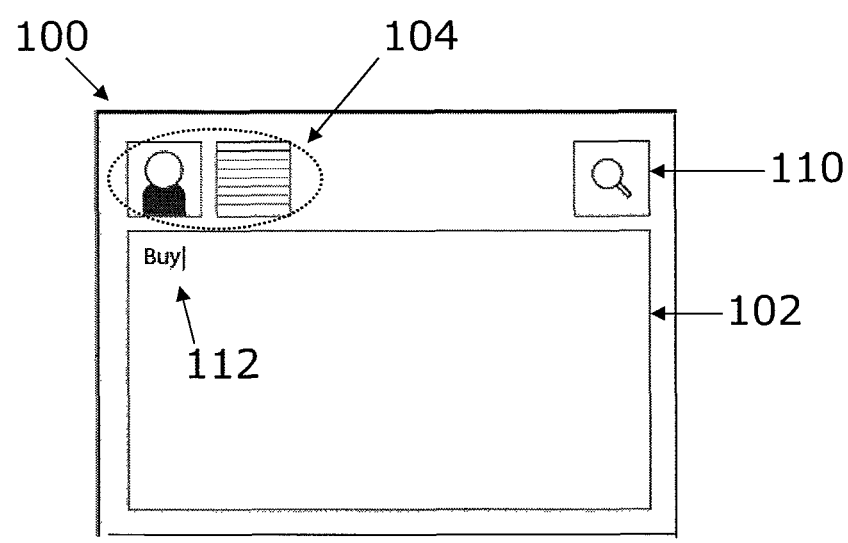
Figure 2:
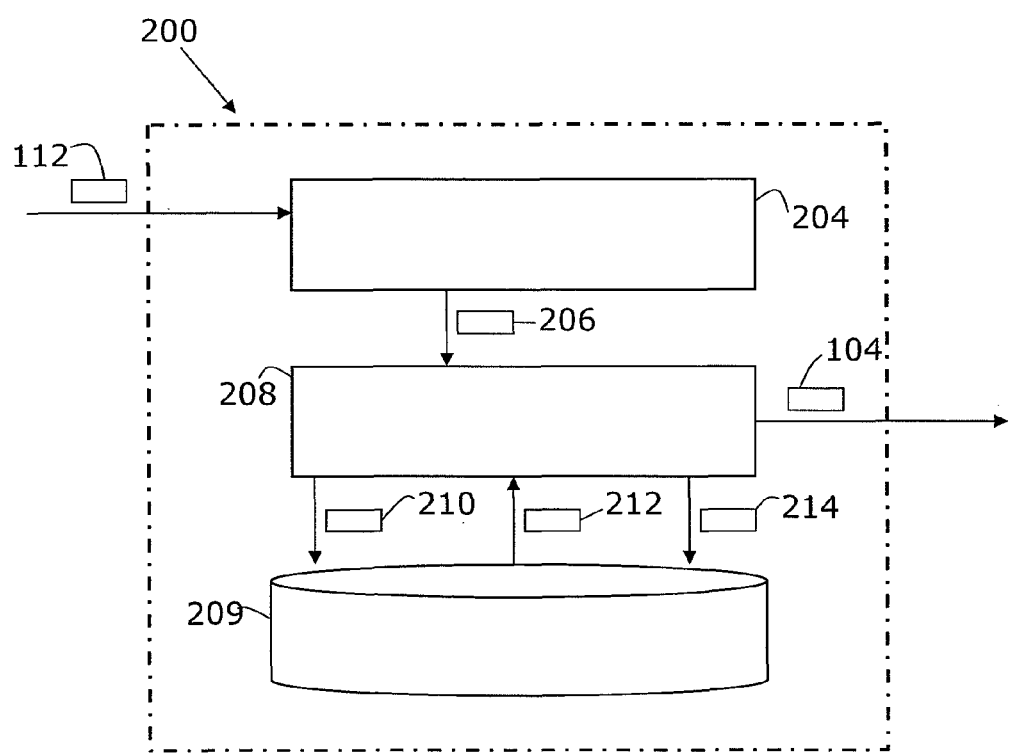
FIG. 2 is a block diagram of a designation prediction device according to example embodiments.

FIGS. 1A-1F illustrate an example screen captions 100, and FIG. 2 illustrates a communication designation prediction device 200 according to example embodiments.

In FIG. 1A, the screen caption 100 includes a universal input field 102 where user input may be entered. Above the universal input field 102, a list of potential message recipients 104 may be included. Initially, before any data has been entered in the universal input field 102, the recipient list may comprise a default of any number of frequent message recipients from a contact list 106 and/or frequently used applications 108 that may be resident on and/or associated with a communication device. It should be appreciated that the default list may be determined adaptively and/or dynamically based on the user's communication history, a user's activity history, and/or the user may have the ability to edit the default list. The screen caption 100 may also include a find option 110 where a user may search through a list of applications and/or contact recipients, for example, through the use of menus in any manner known in the art.

FIG. 1B depicts the entry of user data 112 in the universal input field 102. An analyzer 204 of the communication destination prediction device 200 may be configured to continuously monitor the universal input field 102 for input, for example, per character or other particular parseable portion of data. Therefore, upon data 112 being entered in the input field 102, the data 112 and/or portions thereof may be immediately sent to the analyzer 204. The analyzer 204 may be configured to look for a number of "action words." In the example provided in FIG. 1B, the word 'Hi' may be identified as an action word. Typically, emails and/or text (e.g., SMS) messages begin with the word 'Hi'; therefore, the analyzer 204 may be programmed to identify the word 'Hi' as an action word, for example, if the word is the first word input in the universal input field 102. It should be appreciated that the analyzer 204 may be adaptively trained to search for action words based on a user's history and/or the analyzer 204 may be programmed by the user and/or manufacturer. It should further be appreciated that an action word may take on other forms. For example, an action word may be a name of an application or a contact stored in a contact database associated with a communication device.

In the example provided by FIG. 1B, the analyzer 204 may provide the action word 206 'Hi' to the processor 208. The processor 208 may in turn use the action word as a search variable 210 to perform a search of a database 209, for example, of a user's communication history. In the present example, the processor may search for frequently and/or recently emailed and/or texted recipients. The database 209 may return search results 212 based on at least one occurrence in the user history back to the processor 208, where the processor 208 may return a suggested destination list 104 to the display screen associated with a communication device.

It should be appreciated that the processor 208 may be configured to continuously provide suggested destinations 104 as the data 112 entered into the universal input field 102 is entered and/or altered. For example, in FIG. 1C, the analyzer 204 may detect entry of a second action word, 'game,' in the universal input fiend 102. The analyzer 204 may forward a second search variable 206 based on the second detected action word (or a combination of the first and second detected action words) to the processor 208, which in turn may perform a second search of the database 209 for frequent and/or recent occurrences associated with the second search variable 206. In the example provided by FIG. 1C, the database may provide a second search result 212 including contacts which have been frequently and/or recently emailed and/or texted, with the subject of the email relating to a game. The processor 209 may then provide an updated suggested destination list 104 (e.g., a modified previous suggested destination list) to the display screen 100. At any time, a user may select a contact from the suggested destination list 104, as shown by a (shadowed) fingerprint 114. The selected contact may appear in a subsequent destination list 104, for example, with a check-marked logo 116 or other (e.g., visual) identifier. The processor 208 may continue to suggest additional destinations 104 even though a particular destination has been selected, as shown in FIG. 1D. In some embodiments, subsequent suggested destination lists may be formulated based at least in part on the user-selected destination. In other words, relational groupings of particular destinations may be used to construct a particular suggested destination list 104. The user may also have the option to manually search for a communication destination using the search option 110.

Once a destination has been selected, a user may be presented the option to send the message 118. Upon sending the message, the processor 208 may send information relating to the recent occurrence 214 to the database 209. In the current example, search variables 'Hi' and 'game' may be indexed in the database along with the chosen destinations or recipients. Therefore, the user communication history may be continuously updated and adapted to a particular user. Thus, the accuracy of the suggested destination list 104 may improve overtime.

It should be appreciated that action words may also be names. For example, if a user types 'Hi Dave' into the input field, the analyzer may identify the words 'Hi' and 'Dave' as action words. Furthermore, the processor may be configured to search for common nicknames and/or alternatives based on the action words. Specifically, the processor may search the communication history database with the search variables 'Dave' and variants thereof, such as 'David.' The returned search results in this instance may be all entries in the user's contact list having names similar to Dave and/or variants thereof, e.g., David.

It should further be appreciated that in addition to a communication history of the user, the processor may also be configured to search and/or determine a suggested destination based on a user's activity history. For example, if a user has recently looked at status updates through a mobile browser, the processor may be more likely to determine the suggested destination as an application providing status updates. Additionally, if a user has recently viewed a photograph included a tagged user; the processor may determine an increased likelihood of the current user communicating with the tagged user.

It should also be appreciated that the suggested destination may also be an application, as shown in the example provided in FIG. 1E. In FIG. 1E, the analyzer 204 may receive or monitor text 112 entered into the universal input field 102. In the current example, the analyzer 204 may determine that the word 'Is' is an action word. The analyzer 204 may send the determined action word as a search variable 206 to the processor 208. The processor may then search through the user communication history in database 209. A search result 212 based on at least one occurrence may be returned to the processor 208. Based on the search result, the processor 208 may then send a suggested destination list 104 to the display screen 100. In the current example, the suggested destination list 104 comprises two applications Facebook® and Twitter®. Many users typically enter Facebook® and Twitter® updates starting with the word 'is,' therefore, the user communication history may indicate frequent destinations associated with the word 'is.'

FIG. 1F provides yet another example of embodiments of the present invention. In FIG. 1F, the analyzer 204 may determine the action word to be 'Buy,' based on this action word, the suggested destination list 104 may include a contact or a note to serve as a reminder to the user. It should be appreciated that the predicted destination may be a specific service provided by an application. For example, the application may be an email and the different services may include posting to a blog or communicating with a person. The predicted destinations may be a function of the user's communication history, activity history, and/or any predefined settings that may be implemented. It should be appreciated that action words may be determined based on any number of factors, for example, words (including names), case, order of words, disposition, syntax, phrasing, particular weighting, selected destinations, destination groups, etc.

The above mentioned and described embodiments are only given as examples and should not be limiting to the present invention. Other solutions, uses, objectives, and functions within the scope of the invention as claimed in the below described patent claims should be apparent for the person skilled in the art.

Furthermore, the various embodiments of the present invention described herein is described in the general context of method steps or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Software and web implementations of various embodiments of the present invention can be accomplished with standard programming techniques with rule-based logic and other logic to accomplish various database searching steps or processes, correlation steps or processes, comparison steps or processes and decision steps or processes. It should be noted that the words "component" and "module," as used herein and in the following claims, is intended to encompass implementations using one or more lines of software code, and/or hardware implementations, and/or equipment for receiving manual inputs.

What is claimed is:

1. A method of predicting a communication destination, the method comprising:
   analyzing, by a device, a message entered in a universal input field provided via a display of the device;
   determining, by the device, at least one search variable based on the message;
   determining, by the device, at least one suggested destination and a first application based on the at least one search variable; and
   using, by the device, the first application to transmit the message to the at least one suggested destination.

2. The method of claim 1, where determining the at least one suggested destination and the first application further comprises:
   searching a communication history of a user of the device based on the at least one search variable,
   determining that the user communicated with a particular other user using the first application, and
   determining the at least one suggested destination and the first application based on the user communicating with the particular other user using the first application,
      the at least one suggested destination including information identifying the particular other user.

3. The method of claim 2, where determining the at least one suggested destination further comprises:
   providing the at least one suggested destination further based on a quantity of communications between the user and the particular other user in the communication history.

4. The method of claim 2, further comprising:
   determining a current interaction of the user,
      the current interaction including a selection of the at least one suggested destination; and
   adaptively updating the communication history based on the current interaction.

5. The method of claim 1, where determining the at least one suggested destination and the first application includes:
   determining, based on the at least one search variable, a second application that is different from the first application.

6. The method of claim 1, where the at least one suggested destination includes a contact entry.

7. The method of claim 1, where the at least one suggested destination includes a service.

8. The method of claim 1, where the at least one search variable is an action word associated with a particular type of application, and
   where determining the at least one suggested destination and the first application includes:
      determining a type of application associated with the action word, and
      determining the first application based on the action word being associated with the particular type of application.

9. The method of claim 1, where the at least one search variable is a contact associated with a user of the device.

10. A device comprising:
    a processor to:
       analyze a message entered in an universal input field provided via a display of the device,
       determine at least one search variable based on the message;
       determine:
          at least one suggested destination of the message, and
          a first application,
             the at least one suggested destination and the first application being determined based on the at least one search variable, and
       use the first application to provide the message to the at least one suggested destination.

11. The device of claim 10, where, when determining the at least one suggested destination and the first application, the processor is further to:
    search a communication history associated with a user of the device based on the at least one search variable,
    determine that the user communicated with another user using the first application, and
    determine the at least one suggested destination and the first application based on the user communicating with the particular other user using the first application,
       the at least one suggested destination including information identifying the particular other user.

12. The device of claim 11, where, when determining the at least one suggested destination, the processor is further to:
    determine the at least one suggested destination based on a quantity of communications between the user and the particular other user in the communication history.

13. The device of claim 11, where the processor is further to:
    determine a current interaction of the user,
       the current interaction including a selection of the at least one suggested destination; and
    adaptively update the communication history based on the current interaction.

14. The device of claim 10, where, when determining the at least one destination and the first application, the processor is further to:
    determine, based on the at least one search variable, a second application that is different from the first application.

15. The device of claim 10, where the at least one suggested destination includes a contact entry.

16. The device of claim 10, where the at least one suggested destination includes a service.

17. The device of claim 10, where the at least one search variable is an action word associated with a particular type of application, and
    where, when determining the at least one suggested destination and the first application, the processor is further to:
       determine a type of application associated with the action word, and
       determine the first application based on the action word being associated with the particular type of application.

18. The device of claim 10, where the at least one search variable is a contact associated with a user of the device.

* * * * *